2,806,034

3-(HETEROCYCLIC-SUBSTITUTED ALKYL)THIA-NAPHTHENES AND SALTS THEREOF

Walter Voegtli, Evanston, Ill., assignor to G. D. Searle & Co., Chicago, Ill., a corporation of Delaware No Drawing. Application January 9, 1956,
Serial No. 557,847

8 Claims. (Cl. 260—286)

The present invention relates to 3-(heterocyclic-substituted alkyl)thianaphthenes in which the heterocyclic substituent is a bicyclic radical containing a single annular nitrogen atom. It is specifically concerned with the free bases of the structural formula

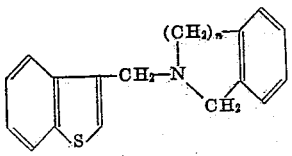

wherein $n$ is 1 or 2, and with non-toxic salts of these bases. When $n$ has the value of 1 in the foregoing structural formula, the compounds are structurally related to isoindoline, whereas when $n$ has the value of 2, the compounds are structurally related to 1,2,3,4-tetrahydroisoquinoline.

In one of the methods for the manufacture of the compounds of this invention, a 3-haloalkylthianaphthene such as 3-chloromethylthianaphthene is heated with a heterocyclic compound having a reactive hydrogen atom, for example, 1,2,3,4-tetrahydroisoquinoline. It is convenient to carry out this reaction in a relatively unreactive solvent such as a lower aliphatic alcohol or a lower aliphatic ketone, and to isolate the reaction product as the free base.

Various modifications of this procedure are useful, particularly for the manufacture of the compounds of this invention which are structurally related to isoindoline. Suitable starting materials for the preparation of such compounds are a 3-haloalkylthianaphthene and an alkali metal derivative of phthalimide. For example, reaction of 3-chloromethylthianaphthene with potassium phthalimide and isolation of the condensation product yields 3-(1,3-dioxoisoindolinomethyl) thianaphthene. Reduction of the carbonyl groups to methylene groups by a reducing agent such as lithium aluminum hydride in ether yields 3-(isoindolinomethyl)thianaphthene.

The organic bases described herein form nontoxic salts with a variety of inorganic and strong organic acids including sulfuric, phosphoric, hydrochloric, hydrobromic, hydriodic, sulfamic, citric, lactic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride, methyl bromide, methyl iodide, ethyl chloride, ethyl bromide, ethyl iodide, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The compounds of this invention have valuable pharmacological properties and are, specifically, hypotensive agents. They are also useful antifungal agents, being particularly effective in inhibiting the growth of *Trichophyton mentagrophytes*.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (°C.), distillation pressures in millimeters (mm.) of mercury and quantities of materials in parts by weight.

Example 1

A stirred mixture of 16.4 parts of 3-chloromethylthianaphthene, 18.4 parts of potassium phthalimide and 70 parts of dimethylformamide is gradually heated. An exothermic reaction which begins at about 70° C. is brought to completion by stirring the mixture at 90° C. for 1 hour and then allowing it to stand at room temperature for 16 hours. There is then added 120 parts of chloroform and 100 parts of water, and the crystalline reaction product is collected on a filter. An additional quantity of product is obtained by extraction of the filtrate with a total of 550 parts of chloroform in three portions. For purification the crystalline reaction product collected on the filter is dissolved in the chloroform extract and the chloroform solution, which now contains all of the reaction product, is washed with dilute sodium hydroxide solution and with several portions of water. The chloroform solution is concentrated to about 10–15% of its original volume and diluted with 130 parts of petroleum ether. Crystallization is induced, and when separation of the product is complete it is collected on a filter and washed with chloroform and petroleum ether. Further purification by recrystallization from a mixture of benzene and petroleum ether yields 3-(1,3-dioxoisoindolinomethyl)-thianaphthene which can also be named as 3-(phthalimidomethyl) thianaphthene. This compound melts at about 162.5–163° C. and has the structural formula

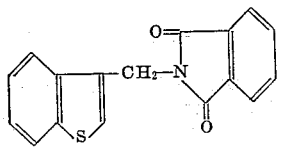

Example 2

To a stirred suspension of 7.5 parts of lithium aluminum hydride in 530 parts of ether there is added a total of 12 parts of 3-(1,3-dioxoisoindolinomethyl)thianaphthene at such a rate that, once the reaction begins, the ether is kept at the boiling point by the heat of the reaction. When the reaction subsides, the mixture is maintained under reflux in a nitrogen atmosphere for an additional 8 hours. Excess lithium aluminum hydride is decomposed by the cautious addition of water with external cooling, and the mixture is stirred with a solution of 120 parts of sodium potassium tartrate in 470 parts of water. The ethereal phase is separated and combined with ether extracts of the aqueous phase. The combined ether solution is extracted with several portions of 2 N hydrochloric acid, whereby the organic base which is the initial reaction product is converted into an oily hydrochloride of limited solubility in both the ether and aqueous phases. The clear ether solution is discarded, and the oily hydrochloride, dissolved in a small amount of methanol, is added to the hydrochloric acid extract. This acidic solution is made alkaline by the addition of cold sodium hydroxide solution. The precipitated free base is dissolved by extraction with several portions of ether, and the combined ethereal extract is washed with water, dried and concentrated. The residue is distilled under reduced pressure in a short-path distillation apparatus, and the principal fraction, which boils at about 150–160° C. at a pressure of 0.01 mm., is further purified by recrystallization from isopropyl alcohol. In this manner there is obtained 3-(isoindolinomethyl)-thianaphthene melting at about 85.5–86° C. This compound has the structural formula

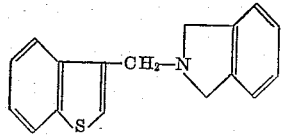

This organic base is converted into the hydrochloride by dissolving it in a minimum quantity of acetone and adding an equivalent amount of hydrogen chloride in isopropyl alcohol. The precipitated product is collected and purified by recrystallization from a mixture of isopropyl alcohol and ether to afford 3-(isoindolinomethyl)-thianaphthene hydrochloride melting at about 205–206° C.

The hydrobromide is prepared analogously by treatment of an acetone solution of the free base with an equivalent amount of hydrogen bromide in isopropyl alcohol.

*Example 3*

A solution of 3 parts of 3-(isoindolinomethyl)-thianaphthene, 8 parts of acetone and 6.8 parts of methyl iodide is allowed to stand. An exothermic reaction occurs. When crystallization of the quaternary ammonium salt is complete, the reaction mixture is refrigerated and then filtered. Recrystallization of the solid product from ethanol affords 3 - (isoindolinomethyl)thianaphthene methiodide melting at about 201–202° C.

*Example 4*

A solution of 2.5 parts of 3-(isoindolinomethyl)-thianaphthene, 8 parts of butanone and 3.5 parts of ethyl bromide is heated in a sealed reaction vessel at about 60° C. for 18 hours. The cooled reaction mixture is diluted with ether, and when separation of the product is complete, it is collected on a filter. This compound is 3-(isoindolinomethyl)thianaphthene ethobromide.

*Example 5*

A mixture of 7 parts of 3-chloromethylthianaphthene, 11.3 parts of 1,2,3,4-tetrahydroisoquinoline and 65 parts of butanone is heated under reflux for 20 hours. The butanone is removed by distillation in a nitrogen atmosphere, and the residue is partitioned between ether and water. The aqueous phase is discarded. The ethereal phase is extracted with 50 parts and then with 20 parts of 2 N hydrochloric acid, causing the conversion of the reaction product into a hydrochloride having limited solubility in either solvent phase. The clear ether solution is discarded, and that portion of the oily hydrochloride which is insoluble in the aqueous hydrochloric acid phase is dissolved in a small amount of methanol. The methanol solution and the aqueous hydrochloric acid extract are combined and made basic by the addition of a cold, saturated potassium carbonate solution. When crystallization of the organic free base is complete, it is collected on a filter and then redissolved in a 20 volume percent solution of chloroform in ether. This solution is dried, filtered and concentrated to dryness. Purification of the residue by recrystallization from isopropyl alcohol yields 3-(1,2,3,4-tetrahydroisoquinolinomethyl)thianaphthene which melts at about 87–88° C. and has the structural formula

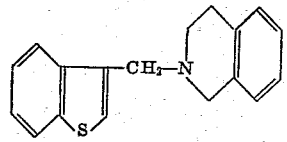

This compound is converted to the hydrochloride by dissolving 3 parts of the free base in 12 parts of warm isopropyl alcohol and adding a slight excess of hydrogen chloride in isopropyl alcohol. Ether is then added, and crystallization is induced. When separation of the product is complete, it is collected on a filter and purified by recrystallization from a mixture of ethanol and ether. In this manner there is obtained 3-(1,2,3,4-tetrahydroisoquinolinomethyl)thianaphthene hydrochloride melting at about 191–193° C.

The citrate is obtained by treating a solution of the free base in a minimum quantity of isopropyl alcohol with an equivalent amount of citric acid in isopropyl alcohol.

*Example 6*

A solution of 2 parts of 3-(1,2,3,4-tetrahydroisoquinolinomethyl)thianaphthene in 12 parts of acetone and 7 parts of methyl iodide is allowed to stand at about 25° C. for 24 hours. Crystallization is induced, and when separation of the product is complete, it is collected on a filter and washed with acetone and with petroleum ether. The crude product is recrystallized by dissolving it in hot nitromethane and adding an equal volume of petroleum ether and then sufficient acetone to make a homogeneous solution. This compound can also be recrystallized from a mixture of methanol, petroleum ether and acetone. The purified salt, 3 - (1,2,3,4-tetrahydroisoquinolinomethyl)-thianaphthene methiodide, melts at about 201.5–202° C.

*Example 7*

A mixture of 4 parts of 3-(1,2,3,4-tetrahydroisoquinolinomethyl)thianaphthene, 45 parts of chloroform and 1.97 parts of ethylene bromohydrin is heated in an open reaction vessel until all of the chloroform is removed by distillation. A heating period of about 4 hours, with the use of an external heating bath maintained at about 90–100° C., are convenient operating conditions for carrying out this procedure. The reaction product is obtained by dissolving the residue in ethanol and precipitating the insoluble quaternary ammonium salt by addition of ether. This compound, 3-(1,2,3,4-tetrahydroisoquinolinomethyl)thianaphthene hydroxyethobromide, has the structural formula

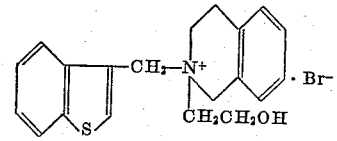

What is claimed is:

1. A compound of the group consisting of the organic bases of the structural formula wherein $n$ is a positive integer less than 3, and nontoxic salts thereof.

2. 3-(isoindolinomethyl)thianaphthene.

3. A non-toxic quaternary ammonium salt of 3-(isoindolinomethyl)thianaphthene.

4. 3-(isoindolinomethyl)thianaphthene methiodide.

5. 3 - (1,2,3,4-tetrahydroisoquinolinomethyl)thianaphthene.

6. A non-toxic quaternary ammonium salt of 3-(1,2,3,4-tetrahydroisoquinolinomethyl)thianaphthene.

7. 3 - (1,2,3,4-tetrahydroisoquinolinomethyl)thianaphthene methiodide.

8. In a process for the manufacture of a compound of the group consisting of the organic bases of the structural formula

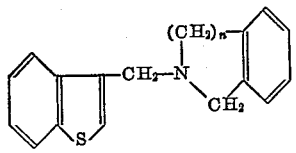

wherein $n$ is a positive integer less than 3, and nontoxic salts thereof, the steps which comprise heating a 3-halomethylthianaphthene with a member of the group consisting of compounds of the structural formula

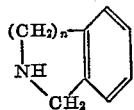

and alkali metal and polyoxo derivatives thereof, followed by reducing to methylene any carbonyl groups present in the condensation product.

References Cited in the file of this patent

The Chemistry of Heterocyclic Compounds, Hartough and Meisel Volume: Compounds With Condensed Thiophene Rings, pages 72 and 124, 1954, Interscience Publishers, New York.